(12) United States Patent
Ono et al.

(10) Patent No.: US 6,192,615 B1
(45) Date of Patent: Feb. 27, 2001

(54) INTRALINE FISHING ROD

(75) Inventors: Hiroyuki Ono, Kanagawa; Eiji Sugaya, Tokyo; Tomoyoshi Tsurufuji, Saitama, all of (JP)

(73) Assignee: Daiwa Seiko, Inc., Higashikurume (JP)

( * ) Notice: Subject to any disclaimer, the term of this patent is extended or adjusted under 35 U.S.C. 154(b) by 0 days.

(21) Appl. No.: 09/237,893

(22) Filed: Jan. 27, 1999

(30) Foreign Application Priority Data

| Jan. 28, 1998 | (JP) | 10-030428 |
| Apr. 24, 1998 | (JP) | 10-129714 |
| Jun. 17, 1998 | (JP) | 10-186838 |

(51) Int. Cl.[7] ............ A01K 87/00; A01K 87/04
(52) U.S. Cl. .............. 43/18.1; 43/18.5; 43/24
(58) Field of Search .................. 43/18.1, 18.5, 43/24

(56) References Cited

U.S. PATENT DOCUMENTS

| 2,777,239 | * | 1/1957 | Cushman | 43/24 |
| 5,231,783 | * | 8/1993 | Utsuno et al. | 43/18.5 |
| 5,381,619 | * | 1/1995 | Watkins | 43/18.1 |
| 5,488,797 | * | 2/1996 | Akiba | 43/18.1 |
| 5,647,162 | * | 7/1997 | Akiba et al. | 43/24 |
| 5,703,194 |   | 12/1997 | Malik et al. | 528/70 |
| 5,704,157 | * | 1/1998 | Utsuno et al. | 43/24 |
| 5,829,182 | * | 11/1998 | Okamoto et al. | 43/24 |
| 5,979,103 | * | 11/1999 | Sunaga et al. | 43/24 |
| 6,048,425 | * | 4/2000 | Sunaga et al. | 43/24 |
| 6,108,959 | * | 8/2000 | Tsurufuji et al. | 43/18.1 |

FOREIGN PATENT DOCUMENTS

| 872181A2 | * | 10/1998 | (EP) . |
| 885561A2 | * | 12/1998 | (EP) . |
| 1 541 807 |   | 9/1967 | (FR) . |
| 2029828 | * | 10/1970 | (FR) | 43/24 |
| 5-268858 |   | 10/1993 | (JP) . |
| 407289123A | * | 11/1995 | (JP) . |
| 8-9841 | * | 8/1996 | (JP) . |
| 9-37684 |   | 2/1997 | (JP) . |
| 409172911A | * | 7/1997 | (JP) . |
| WO 95 07609 |   | 3/1995 | (WO) . |

OTHER PUBLICATIONS

Patent Abstracts of Japan, vol. 097, No. 007, Jul. 31, 1997 & JP 09 065799 A, Mar. 11, 1997 *abstract*.
Patent Abstracts of Japan, vol. 097, No. 007, Jul. 31, 1997 & JP 09 070245 A, Mar. 18, 1997 *abstract*.
Patent Abstracts of Japan, vol. 098, No. 006, Apr. 30, 1998 & JP 10 034082 A, Feb. 10, 1998 *abstract*.

* cited by examiner

*Primary Examiner*—Darren W. Ark
(74) *Attorney, Agent, or Firm*—Liniak, Berenato, Longacre & White, LLC

(57) ABSTRACT

An intraline fishing rod includes a hollow rod pipe having an internal surface and an external surface. A plurality of line guide protrusions protrude radially inwardly from the internal surface. Each of the line guide protrusions has front and rear ends, an apex, and front and rear slopes. A water-repellent layer is provided to extend continuously between the line guide protrusions, thereby entirely covering the front and rear ends, the apices and the front and rear slopes of the line guide protrusions and the internal surface of the rod pipe.

15 Claims, 7 Drawing Sheets

FIG.9(a)  FIG.9(b)
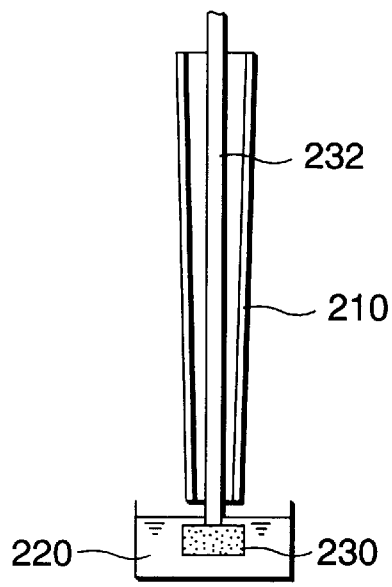
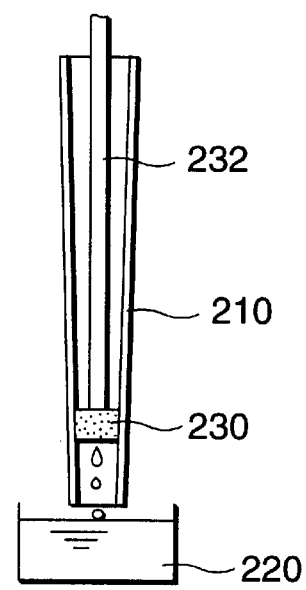
FIG.10
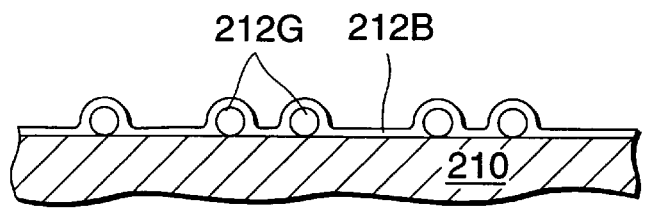
FIG.11
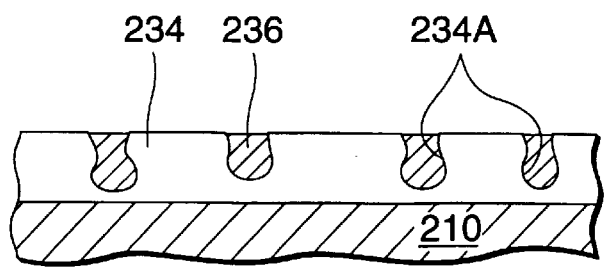

INTRALINE FISHING ROD

BACKGROUND OF THE INVENTION

The present invention relates to a through-type or interline-type fishing rod.

The through-type fishing rod is designed so that a fishing line is passed through the inside of the rod. Therefore, the fishing rod of this type requires a fishing line guiding structure inside the rod for smoothly guiding the fishing line while bearing against the wearing caused as a consequence of the sliding contact between the fishing line and the inside of the rod. The fishing line guide structure is constructed using anti-friction and high-strength materials, but the anti-friction and high-strength material is low in water-repellent property.

It is known that water drops staying in or adhering onto the inside of the rod adversely increase the friction resistance during fishing. Therefore, a water-repellent structure is required in order to prevent the water drops from staying in the inside of the rod. The material for the water-repellent structure is, however, low in strength and anti-friction property.

SUMMARY OF THE INVENTION

A primary object of the present invention is to provide a novel structure for a through-type or interline-type fishing rod, which can maintain both anti-friction and water-repellent properties required.

The present invention provides a through type fishing rod comprising:
  a hollow rod pipe having an internal surface and an external surface;
  a plurality of line guide protrusions protruding radially inwardly from the internal surface, each of the line guide protrusions having front and rear ends continuous to the internal surface in a longitudinal direction of the rod pipe, an apex the most distanced from the internal surface radially of the rod pipe, and front and rear slopes extending respectively from the apex to the front and rear ends; and
  a water-repellent layer extending continuously between adjacent two of the line guide protrusions, the water-repellent layer entirely covering at least the rear slope and rear end of a forwardly located one of the adjacent line guide protrusions, the internal surface between the rear end of the forwardly located one and the front end of a rearwardly located one of the adjacent line guide protrusions; and the front end and front slope of the rearwardly located one.

The apices of the adjacent two line guide protrusions may be exposed from the water-repellent layer. Alternatively, the apices of the adjacent two line guide may be covered by the water-repellent layer.

The water-repellent property is exhibited at any longitudinal and circumferential portions of the interior of rod pipe through which a fishing line is passed. This can prevent the water drops from staying in the interior of the rod pipe, thereby improving the line guiding property. That is, the friction-less line guiding can be achieved.

The line guide protrusions define a line guide surface at their apices in cooperation with the water-repellent layer. During fishing, the line guide surface guides a fishing line while being brought into a point contact with the fishing line. Thus, the friction-less line guiding ability can be further enhanced.

Even if the water-repellent layer at the apex of the line guide protrusion is worn out, the exposed apex of the line guide protrusion has the sufficient anti-friction property to maintain the contour of the line guide protrusion, so that the point contact between the apex (or line guiding surface) and the fishing line, which is required for the friction-less line guiding ability, can be maintained for a long time of the use.

The present invention further provides a through-type fishing rod comprising a tube made of a fiber-reinforced plastic having provided on the inner surface thereof a guide for a line, wherein
  the guide comprises a core part and a water-repellent part which is integrally provided to cover at least the lower half (radially outer half) of the height of the core part on the top side and/or the butt side of the core part,
  at least the top of the core part is made of a material having higher wear resistance than the water-repellent part, and
  the water-repellent part is thicker at the foot of the core part than at a position farther from the foot in the longitudinal direction of the rod and at a position nearer to the top of the core part.

It is preferable that the water-repellent part be provided on at least the butt side of the core part.

Since at least the top of the guide, on which a line is guided, is formed of a material having higher wear resistance than the water-repellent part, even if the water-repellent part covering the core part of the guide wears down, the guide retains its durability. At least the lower half on at least one side of the core part is covered with the water-repellent part, that is, it is only the top of the core part and its vicinities that may not be covered with the water-repellent part. Therefore, water drops hardly collect at the foot of the guide. If a guide has a steep slope, even being covered with a water-repellent layer, water drops are apt to collect at the foot. In the present invention, because the water-repellent part is thickest at the foot than at any other parts thereby making the slope gentler, water drops hardly gather at the foot. In addition, the water-repellent part at the foot keeps its shape against repetition of cleaning owing to its sufficient thickness, assuring sufficient duration of water repellency at the most important part.

While a line is reeled out, water having entered the inside of the rod moves toward the top side and gather at the rear (butt side) of the guide. Therefore, in order to prevent water drops from gathering it is more effective to provide the water-repellent part on at least the butt side of the guide.

The present invention further provides a through-type fishing rod comprising a tube made of a fiber-reinforced plastic (hereinafter abbreviated as FRP) having provided on the inner surface thereof a guide for a fishing line, wherein the guide has a plurality of projections arrayed in the longitudinal direction of the rod, and a layer comprising a fluoro resin matrix containing fluoro resin particles is provided on the inner surface of said tube between every adjacent foot of said guides.

In a preferred embodiment, the guide is a spiral guide made of a fiber-reinforced plastic, and the layer is provided between every adjacent projections and is thicker at the feet of the projections than at a position farther from the feet.

According to the present invention, the layer exhibits improved water repellency because both the matrix and the particles incorporated therein are fluoro resins. Even if the particles projecting over the surface of the layer are worn by friction with a line, the water repellency can be maintained because the matrix is a fluoro resin. Even if the fluoro resin layer has weak adhesion to the inner surface of the tube, it is durable and hardly comes off since it is protected from the friction with a line by the projections.

A fishing line is let out with looseness while touching not only the top but the sides of the guide. Whether the projection has vertical sides or sloping sides, water drops smoothly slide down the sides so that the necessity of forming a water-repellent layer on the sides is not much. It is the vicinities of the foot of the projection that requires water repellency the most. In the preferred embodiment of the present invention, since the layer is thicker at the foot, it shows water repellency of long duration even if somewhat worn by a line. Further, since the guide is a spiral guide made of an FRP, it is softer than annular guides made of ceramics, hardly affecting the flexibility in deflection of the rod.

The present invention further provides a through-type fishing rod comprising a tube having a projection on the inner surface thereof, wherein a layer comprising a synthetic resin matrix containing a water-repellent material and a wear-resistant material or a layer comprising a water-repellent matrix containing at least one of a wear-resistant material and a lubricating material is provided on the surface of the projection and the inner surface of the tube.

The water-repellent material includes fluoro resins, silicone resins, and any other materials equal or superior in water repellency to such water-repellent resins. The form of the water-repellent material includes particles, fibers having as short in fiber length as whiskers, and a form miscible in its liquid state (molecular state).

In a preferred embodiment of the present invention, the layer is a water-repellent layer which is provided on the top of the projection and the inner surface of the tube.

Where the layer provided on the surface of the projection and the inner surface of the tube contains a water-repellent material and a wear-resistant material, a fishing line is guided with reduced friction by the projection (guide) without clinging to the inner surface of the tube because of the improved water repellency inside the tube, which further ensures reduction of friction. A water-repellent material generally has poor durability, which can be compensated for by the presence of the wear-resistant material.

Where the layer comprises a water-repellent matrix and a wear-resistant material without clinging to the inner surface of the tube because of the improved water repellency inside the tube, which further ensures reduction of friction. Further, the presence of the wear-resistant material brings about improvement in durability.

Where the layer comprises a water-repellent matrix and a lubricating material, a line can be guided by the projection with reduced friction without clinging to the inner surface of the tube because of the improved water repellency inside the tube, which further ensures reduction of friction. Further, the presence of the lubricating material secures improved slip of the line.

According to the preferred embodiment of the present invention, a line can be guided by the projection with reduced friction without clinging to the inner surface of the rod because of the improved water repellency, which further ensures reduction of friction. Since the top of the projection, with which a line comes into contact the most, has a water-repellent layer, water drops are prevented from adhering thereto, making a great contribution to reduction of friction with the line.

The present disclosure relates to the subject matter contained in Japanese patent application Nos. Hei. 10-30428 (filed on Jan. 28, 1998), Hei. 10-129714 (filed on Apr. 24, 1998) and which is expressly incorporated herein by reference in its entirety.

BRIEF DESCRIPTION OF THE DRAWINGS

FIGS. 8, 9(*a*) & (*b*) each illustrate the method for forming a layer on the inner surface of a rod pipe.

FIG. 10 is a sectional view showing a portion of a rod pipe according to another embodiment of the present invention.

FIG. 11 is a sectional view showing a portion of a rod pipe according to another embodiment of the present invention.

DESCRIPTION OF THE PREFERRED EMBODIMENT

The present invention will be described in detail with reference to the accompanying drawings.

Figure 1:
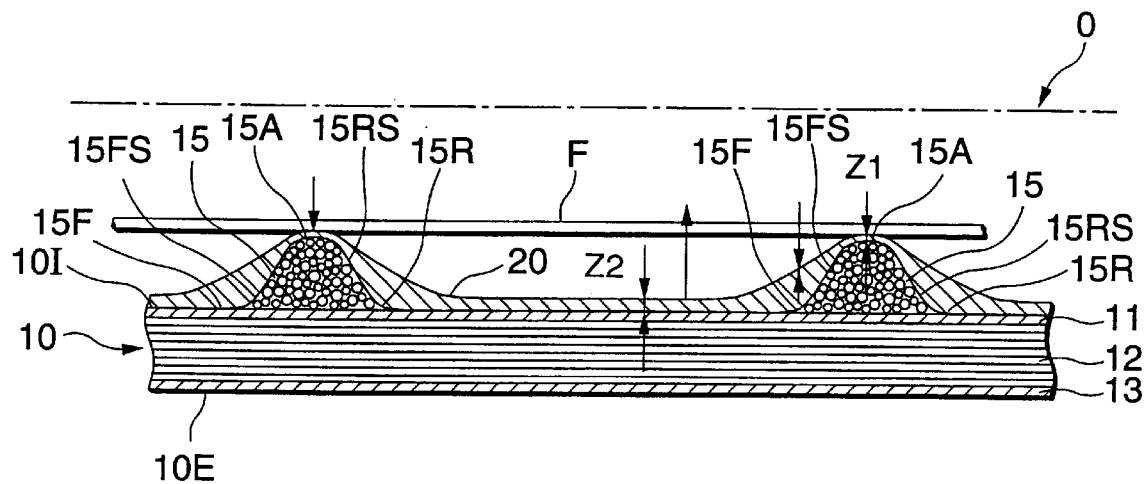
FIG. 1 is a sectional view showing a portion of a rod pipe according to an embodiment of the present invention.

FIG. 1 is a sectional view showing a portion of a hollow rod pipe 10 according to an embodiment of the present invention. The rod pipe 10 is designed to constitute a through-type (an inter-line type) fishing rod. A one-dotted chain line O designate a longitudinal axis of the rod pipe 10. The rod pipe 10 has an internal surface 10I and an external surface 10E.

A plurality of line guide protrusions 15 are protruded radially inwardly from the internal surface 10I. Each of the line guide protrusions 15 has a front end 15F and a rear end 15R that are continuous to the internal surface 10I in a longitudinal direction of the rod pipe 10. Each of the line guide protrusions 15 has an apex 15A which is the most distanced from the internal surface 10I radially of the rod pipe 10. As illustrated, a front slope 15FS and a rear slope 15Rs are provided to extend from the apices 15A to the front and rear ends 15F and 15R, respectively. The apex 15A of the line guide protrusion 15 is preferably rounded.

Figure 2:
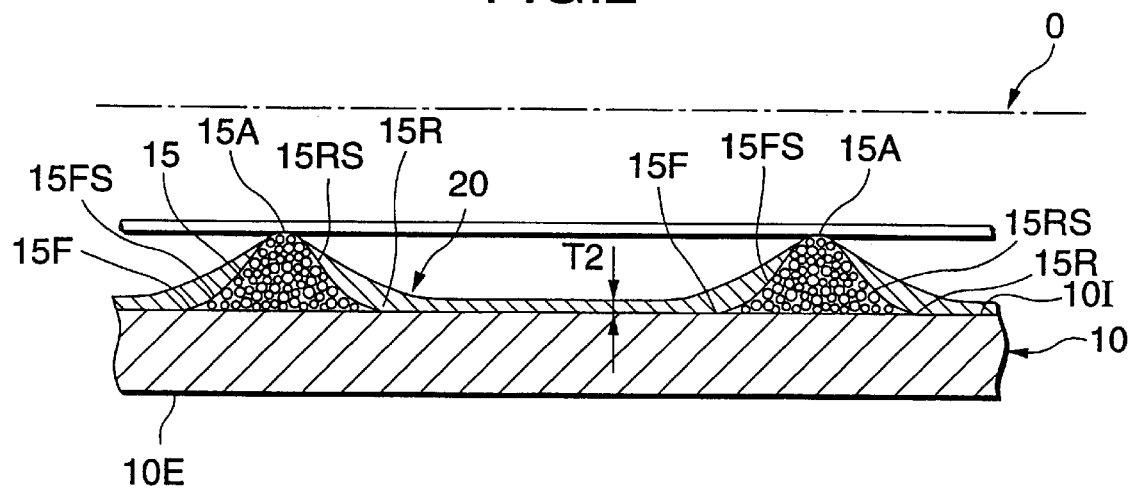
FIG. 2 is a sectional view showing a portion of a rod pipe according to another embodiment of the present invention.

A water-repellent layer 20 is provided to extend continuously between adjacent two of the line guide protrusions 15. The water-repellent layer 20 entirely covers at least the rear slope 15RS and rear end 15R of a forwardly located one of the adjacent line guide protrusions 15, the internal surface 10I between the rear end 15R of the forwardly located one 15 and the front end 15F of a rearwardly located one of the adjacent line guide protrusions 15; and the front end 15F and front slope 15FS of the rearwardly located one 15. In this embodiment, the apices 15A of the two adjacent line guide protrusions 15 are covered by the water-repellent layer 20 so that a single, continuous water-repellent layer is formed entirely in the interior of the rod pipe 10 along the longitudinal direction. The apices 15A of the adjacent two line guide protrusions 15 may be exposed from the water-repellent layer 20 as shown in FIG. 2.

A portion of the water repellent layer 20, which is located at the apex 15A, has the smallest radial thickness Z1 of the water repellent layer 20. The radial thickness of the water repellent layer 20 is gradually increased from the apex 15A of the rearwardly located line guide protrusion 15 to the front end 15F of the rearwardly located line guide 15 along the front slope 15FS of the rearwardly located line guide 15. The radial thickness of the water repellent layer 20 is then gradually decreased from the front end 15F of the rearwardly located line guide protrusion 15, maintained at a constant thickness Z2 along the internal surface 10I and then gradually increased to the rear end 15R of the forwardly located line guide protrusion 15. Thereafter, the radial thickness of the water repellent layer 20 is gradually increased from the rear end 15R of the forwardly located line guide protrusion 15 to the apex 15A of the forwardly located line guide protrusion 15 along the rear slope 15R of the forwardly located line guide protrusion 15. The water repellent layers 20 each having the radial thickness varying in this manner are arranged entirely along the longitudinal direction in association with the line guide protrusions 15 provided inside the rod pipe 10.

In this embodiment, the line guide protrusions 15 are formed by a spiral single guide member. The line guide protrusions 15 contain, as reinforcing fibers, graphite fibers or glass fibers having an elastic modulus of 20 ton/mm$^2$ or more.

The rod pipe, in this embodiment, is constructed by an internal layer 11 defining the internal surface 10I, an external layer 13 defining the external surface 10E and an intermediate layer 12 interposed between the internal and external layers 11 and 13. Each of internal and external layers 11 and 13 contains reinforcing fibers mainly directed in a circumferential direction, whereas the intermediate layer 12 contains reinforcing fibers mainly directed in the longitudinal direction. The reinforcing fibers contained in the internal, intermediate and external layers 11, 12 and 13 are similar in material and characteristic to the reinforcing fibers contained in the line guide protrusions 15.

The water-repellent layer 20 contains fluoro resins, silicone resins, or waxes. Each of these materials is contained in the water-repellent layer 20 as a matrix resin, or the form of particles or short-fibers. That is, the fluoro resins, silicone resins, or waxes may form the substantial portion of the water-repellent layer 20, and/or may be particles or short-fibers mixed in the water-repellent layer 20.

As for the fluoro resins, it is preferable to use tetrafluoroethylene oligomers (TFEO), polytetrafluoroethylene (PTFE), a trifluorochloroethylene resin, or a tetrafluoroethylene-hexafluoropropylene copolymer resin (FEP) as a matrix resin. Similarly, it is preferable to use tetrafluoroethylene oligomers (TFEO), polytetrafluoroethylene (PTFE), a trifluorochloroethylene resin, a tetrafluoroethylene-hexafluoropropylene copolymer resin (FEP), or graphite fluoride as particles or short fibers. As for the silicone resins, it is preferable to use an acrylic silicone resin.

As described above, in this embodiment, the line guide protrusions 15 containing the same fiber reinforcing fibers (such as high elastic and high strength graphite fibers having the elastic modulus of 20 ton/mm$^2$ or more) as those contained in the rod pipe 10 are molded integrally on the internal surface 10I of the rod pipe 10. Further, the exposed surfaces of the line guide protrusions 15 and the internal surface 10I are all covered by the by a continuous water-repellent layer (formed by the water-repellent layers 20) having varying radial thickness.

Therefore, the water-repellent property is exhibited at any longitudinal and circumferential portions of the interior of rod pipe 10 through which a fishing line F is passed. This can prevent the water drops from staying in the interior of the rod pipe 10, thereby improving the line guiding property. That is, the friction-less line guiding can be achieved.

The line guide protrusions 15, which are constructed by the spiral guide member integrally molded on the internal surface 10I of the rod pipe 10 in this embodiment, define a line guide surface at their apex 15A in cooperation with the water-repellent layer 20. During fishing, the line guide surface guides a fishing line F while being brought into a point contact with the fishing line F. Thus, the friction-less line guiding ability can be further enhanced.

Even if the water-repellent layer 20 at the apex 15A of the line guide protrusion 15 is worn out, the exposed apex 15A of the line guide protrusion 15 has the sufficient anti-friction property to maintain the contour of the line guide protrusion 15, so that the point contact between the apex 15 or line guiding surface and the fishing line F, which is required for the friction-less line guiding ability, can be maintained for a long time of the use. Further, the water-repellent layer 20 at the apex 15A of the line guide protrusion 15 is small in radial thickness, and therefore any deep grooves, which may increase the friction between the guide surface and the fishing line, are not formed in this portion even if the water-repellent layer 20 at the apex 15A is worn out. Since the water-repellent layer 20 located at any portions other than the apex 15A is not worn out, the water-repellent property inside the rod pipe 10 can be maintained for a long time of the use.

In addition, in a case where the line guide protrusions 15 are constructed by the spiral guide member, the spiral guide member reinforces the rod pipe 10 to avoid the breakage caused due to the radial pressure from the outside, or the flexure or bending of the rod pipe.

Figure 3:
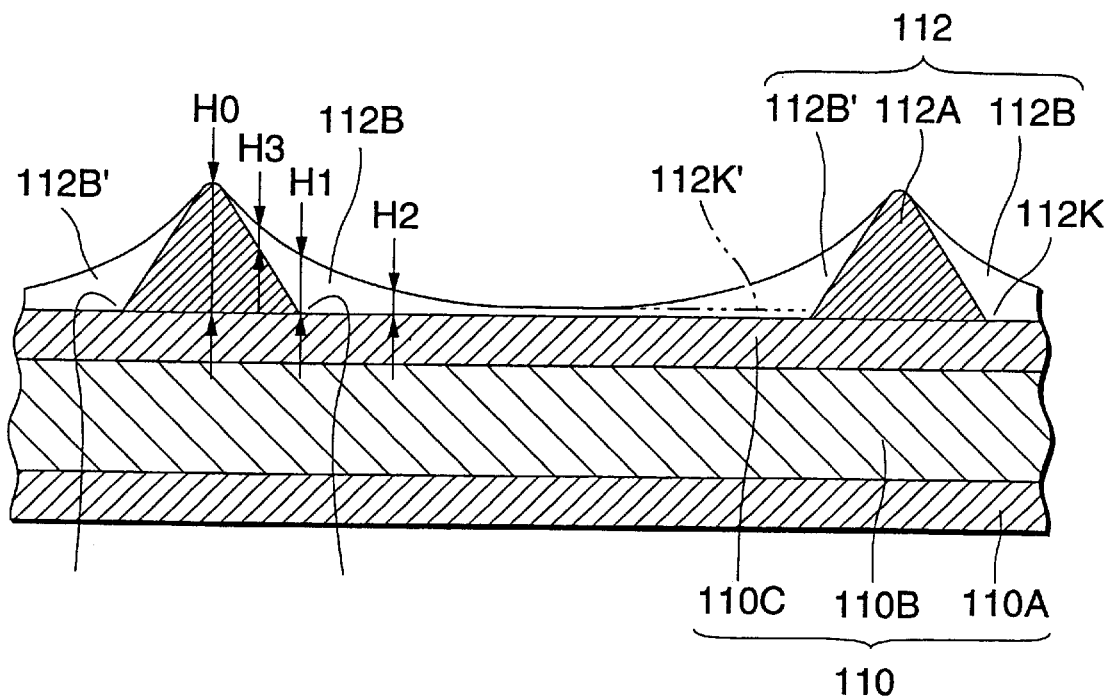
FIG. 3 is a sectional view showing a portion of a rod pipe according to another embodiment of the present invention.

FIG. 3 is a partial longitudinal cross section of an example of the guide structure according to the present invention in which water drops are prevented from gathering at the foot. A tube, i.e. a rod pipe, 110 is made of a fiber-reinforced resin or plastic (hereinafter referred to as an FRP), i.e., a prepreg comprising reinforcing fiber such as carbon fiber pre-impregnated with a synthetic resin (inclusive of thermoplastic resins), such as an epoxy resin, as a matrix. Therefore, the abbreviation FRP as used herein is intended to include not only FRP in the narrow sense of the word but fiber-reinforced thermoplastics (FRTP). The tube 110 according to this embodiment has a three-layer structure composed of an intermediate layer 110B having most of the reinforcing fibers orientated in the longitudinal direction of the rod and outer and inner layers 110A and 110C both having most of the reinforcing fibers orientated in the circumferential direction.

A spiral guide 112 forming a plurality of line guide protrusions is provided on the inner layer 110C. The guide 112 has a core part 112A and water-repellent parts or layers 112B and 112B' covering the butt or rear side and the top or front side of the guide 112, respectively. The core part 112A is made of FRP the reinforcing fiber of which is the same or of the same kind as that used in the inner layer 110C, in which the fibers are mostly orientated in the longitudinal direction of the spiral. Since a line runs across the reinforcing fibers, the core is protected from wear. Because a line is guided by the top or apex of the guide 112, the bottom (or the foot) part of the guide does not necessarily need to be made wear resistant as long as the top is wearable. The guide, especially the top of the guide, can rely for its wear resistance on the directionality of the reinforcing fibers as exemplified above or such a material as ceramics and metal.

In the embodiment shown in FIG. 3, the core part 112A almost has a triangular cross section with its top rounded. A water-repellent part that is softer and less wearable than the core part is provided on both sides of the core part 112A, covering at least the lower half (of the height HO) of the core part. In this embodiment the water-repellent part covers from almost the top to the foot of the core part. Extending from the foot of the guide, the water-repellent part also covers the inner surface of the tube. The guide 112 thus constructed has a gentler slope than the core part 112A as shown. Therefore, the thickness H1 of the water-repellent part at the foot of the core part measured in the radial direction is larger than the thickness H3 at a position nearer to the top of the core part or the thickness H2 at a position farther from the foot of the core part.

Because of such a gentle slope with a water-repellent surface, water drops are prevented from collecting at the foot and thereby prevented from adhering to a line. As far as is consistent with water repellency, the surface of the water-repellent part may have small surface roughness or may have water-repellent particles (hereinafter described) exposed on the surface thereof.

If a guide having such a gentle slope as depicted in FIG. 3 is wholly made up of the material of the core part (particularly the material of the top of the core part) with a thin water-repellent layer formed thereon, the rigidity of the rod in deflection will increase greatly, adversely affecting the flexibility as a fishing rod. Hence, the extension of the foot should be formed of a soft water-repellent material giving little influence on the rigidity in deflection, such as those enumerated below. If desired, particles of wear-resistant materials, such as ceramics or metal, can be incorporated into the water-repellent part to improve the wear resistance.

Repetition of cleaning the inside of the through-type fishing rod will gradually cause wear of the water-repellent part, but the most important part of the water-repellent part wears well because of its large thickness thereby assuring improved durability of the guide as a whole.

In the example of FIG. 3 the water-repellent part is provided on both the top and butt sides (112B' and 112B) of the core part 112A. Supposing the water-repellent part is provided on either one of the sides, it is preferably provided on the butt side. Where the water-repellent part is provided on both sides, it is preferred to make the water-repellent part on the top side thinner than that on the butt side. This is advantageous, for one thing, for reduction in weight of the rod and, for another, for evenly balancing the durability of the two sides, taking it into consideration that a line is liable to come into contact with the butt side to cause wear.

Where the water-repellent part is formed on only the butt side, the end of the water-repellent part 112B on the butt side can be extended toward the foot of the adjacent core part to from a thin water-repellent layer on the inner surface of the tube as shown by the dotted broken line in FIG. 3. Whether the water-repellent part is provided on either one or both sides of the core part, not all the inner surface of the tube 110 does not need to be covered with a water-repellent part. That is, part of the area between two adjacent core parts of the guide may be left uncovered.

Materials which can be used for forming the water-repellent part include water-repellent materials, such as fluoro resins (e.g., polytetrafluoroethylene), silicone resins, waxes, and the like. Resins, such as epoxy resins, mixed with particles of these water-repellent materials having a diameter of 10 $\mu$m or smaller are also used for preference where it is desirable to make the water-repellent part of the same material as used in the inner layer 110C of the tube 110 to achieve unity.

Figure 4:
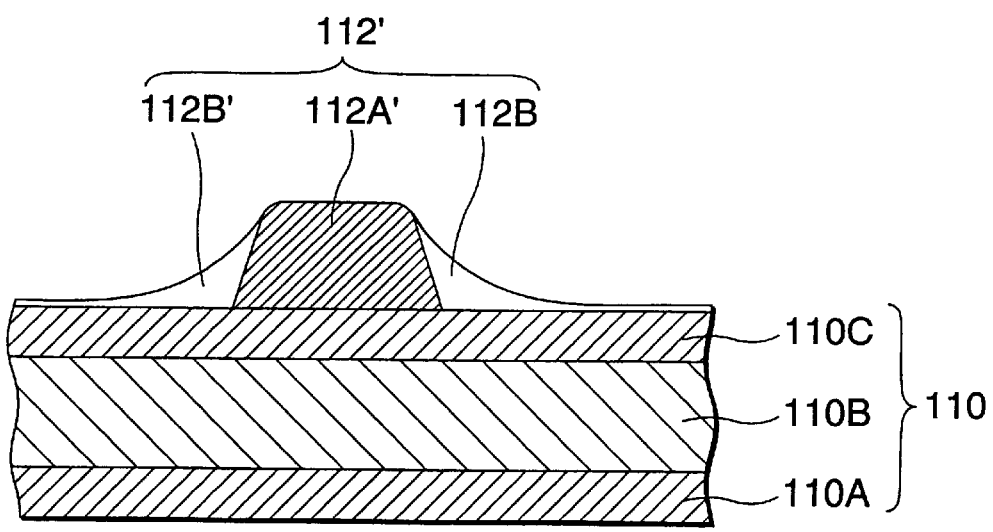
FIG. 4 is a sectional view showing a portion of a rod pipe according to another embodiment of the present invention.

In FIG. 4 is shown a longitudinal cross section of another example of the guide structure 112' according to the present invention, in which the core part 112A' has a trapezoidal cross section. In this embodiment, too, at least the lower half (of the height) of the core part 112A' is covered with a water-repellent material to form water-repellent parts 112B' and 112B on the top and butt sides, respectively. The flat top of the core part 112A' may be covered or uncovered with the water-repellent part.

While the present invention has been described with particular reference to a spiral guide, the above description can apply to a plurality of annular guides or semi-annular guides provided at intervals. Further, the above-described embodiments and manipulations can be applied either singly or in combination thereof or with other conceivable modifications.

According to these embodiment, a through-type fishing rod in which water drops are prevented from gathering at the foot of the line guide while retaining the durability of the guide is provided.

Figure 5:
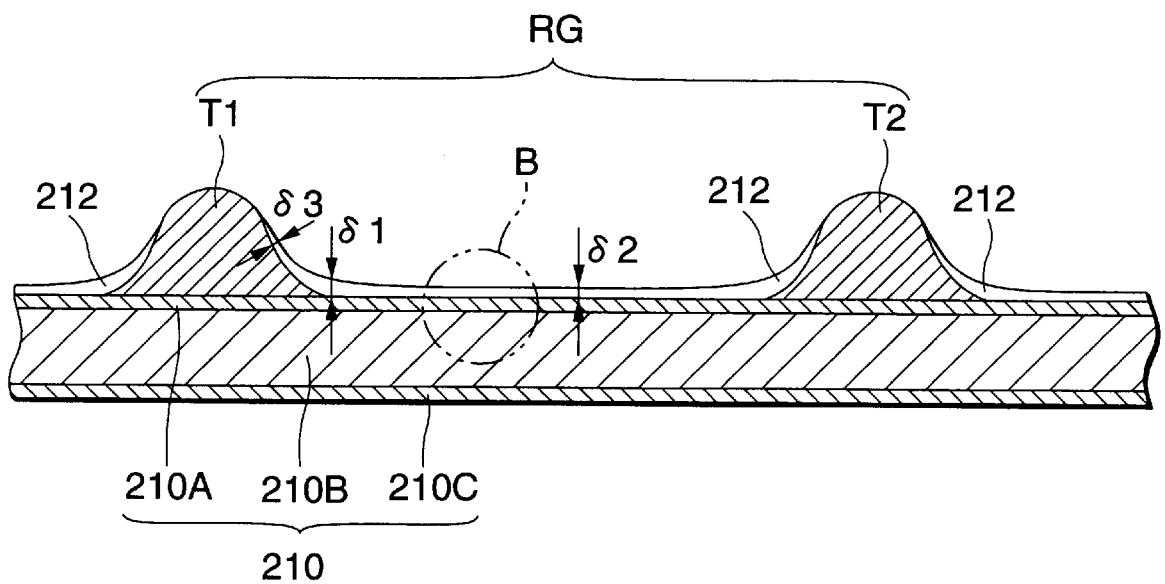
FIG. 5 is a sectional view showing a portion of a rod pipe according to another embodiment of the present invention.
Figure 6:
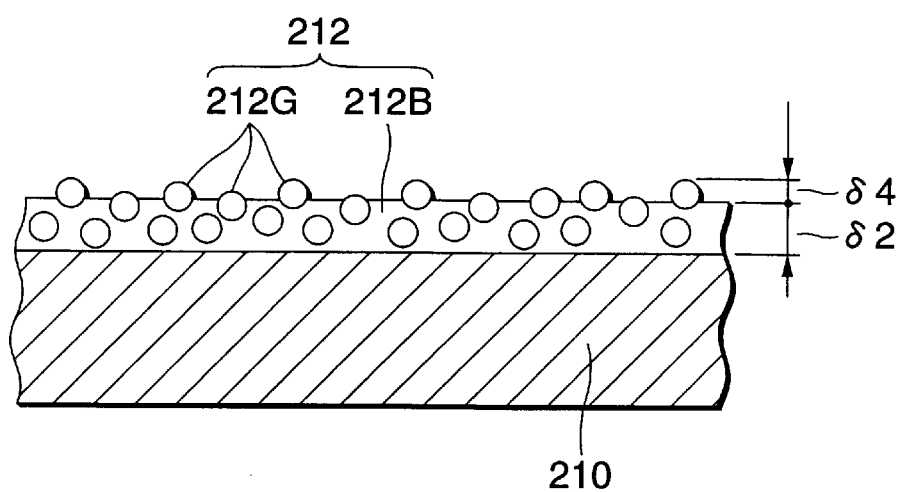
FIG. 6 is an enlarged view showing part B of FIG. 5.

FIG. 5 is a partial longitudinal cross section of an example of the fishing rod according to the present invention. Portion B of FIG. 5 is enlarged in FIG. 6. The fishing rod shown in FIG. 5 comprises a tube or a rod pipe 210 made of an FRP, such as a carbon fiber-reinforced epoxy resin, having integrally provided on the inner surface thereof a spiral guide RG forming a plurality of line guide protrusions. The guide RG is made of an FRP in which reinforcing fibers, such as carbon fibers, orientated in the longitudinal direction of the spiral and lightly twisted are impregnated with a matrix resin, such as an epoxy resin. The tube 210 according to this embodiment has a three-layer structure composed of inner and outer layers 210A and 210C both having most of the reinforcing fibers orientated in the circumferential direction and an intermediate layer 210B having most of the reinforcing fibers orientated in the longitudinal direction of the rod and having a larger thickness than the inner and outer layers 210A and 210C.

A highly water-repellent layer 212 is provided over the area between facing sides of every adjacent projections of the spiral guide RG, for example, between adjacent projections T1 and T2. The layer can be provided on the top of the projections but is ready to wear by the friction with a line. FIG. 5 shows the state that the layer which had been provided on the top of the projections as well as the sides of the projections and the inner wall of the tube 210 for the sake of convenience of an operation has worn out by the friction, but the water repellency is retained on the necessary area. The layer 212 comprises a fluoro resin matrix 212B and fluoro resin particles 212G dispersed therein thereby exhibiting improved water repellency. As schematically illustrated in FIG. 5, the layer 212 has a maximum thickness δ1 at the foot of the projection and becomes thinner at positions farther from the foot. Accordingly, the thickness δ2 on the inner surface of the tube 210 and the thickness δ3 on the sloping sides of projection is smaller than the thickness δ1. Some layer may be present between the inner layer 210A of the tube 210 and the water-repellent layer 212, which also comes under the scope of the present invention.

The thickness δ2 is preferably about 1 to 100 μm, and the surface unevenness of the layer 212, expressed by the height δ4 of the projecting particles, is preferably about 1 to 20 μm. With the thickness δ2 falling within the above range, the increase of the weight of the tube is minimized while satisfying durability as a water-repellent layer. The thickness δ1 is usually about 5 to 200 μm, and the particles usually have a diameter of about 1 to 20 μm.

The fluoro resins which can preferably be used as a matrix resin include tetrafluoroethylene oligomers (TFEO), polytetrafluoroethylene (PTFE), a trifluorochloroethylene resin, and a tetrafluoroethylene-hexafluoropropylene copolymer resin (FEP). Examples of preferred fluoro resins of particles include graphite fluoride (e.g., polycarbon monofluoride $[(CF)_n]$ and polydicarbon monofluoride $[(C_2F)_n]$), PTFE (Teflon), a trifluorochloroethylene resin, and FEP.

A two-part liquid system comprising a trifluorochloroethylene resin and a curing agent, a two-part liquid system comprising PTFE and a curing agent, or a one-pack liquid system comprising PTFE and containing no curing agent is preferred as a matrix resin from the standpoint of adhesion to the substrate.

If desired, the matrix -can contain a curing agent as referred to above and other additives, but it is preferred for the matrix to contain 30% by volume or more, particularly 50% by volume or more, of the fluoro resin. This preference also applies to the composition of the fluoro resin particles.

It is possible to use metal or ceramics as a matrix for the water-repellent layer to increase the wear resistance. Further, use of oil-repellent particles brings about resistance to oil staining, and use of lubricating particles is effective in reducing the friction of a line.

The spiral guide used in the example shown in FIG. 5 can be replaced with a plurality of annular guides provided at intervals, in which case each projection corresponds to each annular guide. The layer 212, being provided between adjacent sides of the guiding projections, hardly comes off the substrate, i.e., has durability. The water-repellent layer can also be provided on the inner surface of a fishing rod with no guides. It can also be applied to the outer surface of a fishing rod to prevent a line from clinging thereto.

Figure 7A:
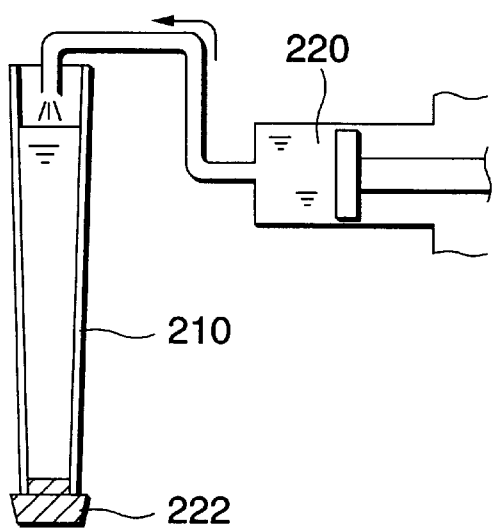
FIGS. 7(*a*) to 7(*b*) each illustrate the method for forming a layer on the inner surface of a rod pipe.
Figure 7B:
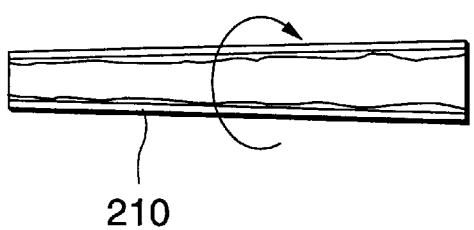

FIGS. 7(a) and 7(b) illustrate a method for forming the layer of the present invention by dip coating. A tube 210 is put vertically with the lower end closed with a stopper 222. A coating composition comprising a fluoro resin matrix and fluoro resin particles is injected into the tube 210 from the other open end by means of a cylinder-piston mechanism (or a pump mechanism) (FIG. 7(a)). The stopper 222 is then removed to discharge the composition. The tube 210 is set horizontally and rotated on its axis to level the coating layer (FIG. 7(b)). Hot air is blown through the tube 210 to dry the coating layer.

Figure 8:
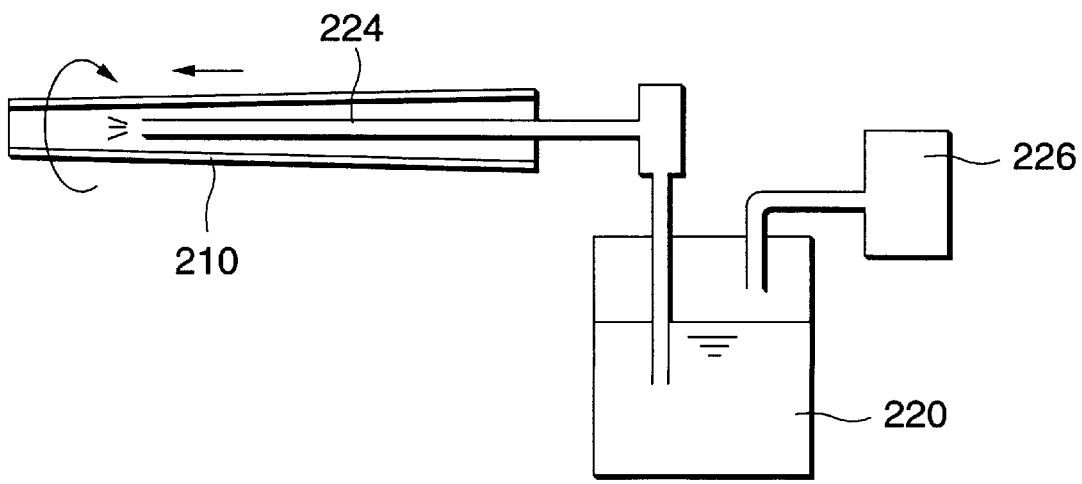

FIG. 8 illustrates a method for forming the layer by spray coating. A spray nozzle 224 is inserted into the tube 210, and the coating composition 220 is fed to the nozzle by means of a compressor 226 and sprayed onto the inner wall of the tube while rotating the tube and moving the tube in the longitudinal direction. Thereafter hot air is blown through the tube to dry the coating layer. The spray coating method is advantageous in that the resin particles easily project over the surface of the layer to exhibit improved water repellency.

FIGS. 9(a) and 9(b) show a method for forming the layer by draw coating. A rod 232 having sponge 230 at the tip is passed through the tube 210. The sponge 230 is impregnated with the coating composition 220 by, for example, soaking in a container (FIG. 9(a)) and then pulled up through the tube 210 (FIG. 9(b)) to apply the composition to the inner wall of the tube. Then hot air is blown into the tube to dry the coating layer.

FIG. 10 depicts a water-repellent layer formed on the inner wall of the tube 210 by ion plating. Fluoro resin particles 212G are first adhered by static electricity. A thin film 212B is then formed by ion plating with a solid fluoro resin excited by resistance heat and high frequency.

A layer comprising nickel as a matrix having incorporated therein fluoro resin particles may be provided as follows. First of all, the inner wall of an FRP tube is subjected to surface treatment consisting of degreasing, washing, etching, washing, neutralization, addition of a catalyst, washing, and activation. The surface treatment is followed by chemical nickel plating. The nickel-plated surface is further chemically plated with nickel containing fluoro resin particles. The plated surface is subjected to chromating, washed with hot water, and heat treated at about 100° C. for 3 hours. From the standpoint of wear resistance and water repellency of the layer, it is desirable to use an electroless nickel plating bath to provide a layer containing 20% by weight or more of the co-precipitated fluoro resin.

A layer comprising chromium as a matrix having incorporated therein fluoro resin particles may be formed as follows. FIG. 11 is referred to. After the same surface treatment as in the case of nickel plating, the inner wall of a tube is plated with chromium. The resulting chromium plating layer 234 is subjected to surface modification and then made porous to have a number of pores 234A. The pores 234A are expanded by heating at, for example, 200° C., and fluoro resin particles are put into the thus expanded pores. The pores are then cooled to, e.g., −70° C. to shrink thereby to contain the particles 236, followed by allowing to stand at room temperature. In this method, the matrix material of the tube should withstand the above thermal history. From this viewpoint, thermoplastic resins, such as polyimide, are preferred to thermosetting resins such as epoxy resins.

Layers made of fluoro resins, metal or ceramics can also be formed on the FRP-made tube by vacuum deposition.

In the embodiments, a water-repellent layer is formed on the inner wall of a tube having integrally provided thereon a spiral guide or annular guides. It is also possible to separately form a water-repellent layer on a temporary substrate and uniting the layer with an FRP tube produced by using a core and a prepreg. It is also possible to produce the fishing rod by a process comprising spraying a coating composition providing a water-repellent layer onto a core, drying the coating layer, setting a guide precursor around the coated core, and winding the core (having thereon the water-repellent layer and the guide precursor) with a prepreg, followed by heating. Where the water-repellent layer of the resulting product has no surface unevenness, it can be roughened afterward to improve the water repellency.

In place of fluoro resins, silicone resins or mixtures of silicone resins and fluoro resins can be used.

The present invention provides a through-type fishing rod the inside wall of which has improved water repellency to prevent water or seawater from gathering, thereby assuring casting performance and preventing icing in the inside of the rod with cold.

Figure 12:
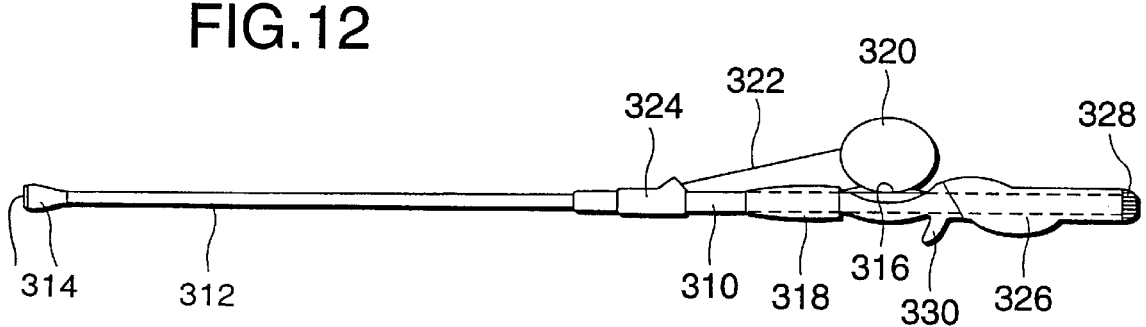
FIG. 12 is a side view of a through-type fishing rod.

FIG. 12 shows a spinning rod as an example of a through-type fishing rod. The rod is composed of a butt section 310 and a top section 312 connected to the butt section. The butt section 310 has a reel seat 316, on which the foot of a reel 320 is mounted and locked with a screw locking nut 318. A butt guide 324 for leading a line 322 into the inside of the rod is provided in front of the real seat 316. The line led through the rod is let out from a top guide 314 of the top section 312. The butt section 310 has a butt grip 326. The screw locking nut 318 also serves as a butt grip. Both the butt grip 326 and the screw locking nut 318 are covered with a soft material such as cork. Numeral 330 indicates a trigger, which is used for manipulating the rod and line. A butt cap 328 is screwed on the end of the butt section 310. With the cap 328 screwed off, the inside of the butt section 310 can be cleaned with ease.

The butt section 310 and the top section 312 are made of fiber-reinforced plastics comprising a thermosetting resin (e.g., an epoxy resin) matrix or a thermoplastic resin matrix reinforced with reinforcing fiber, such as carbon fiber (FRP or FRTP).

Figure 13:
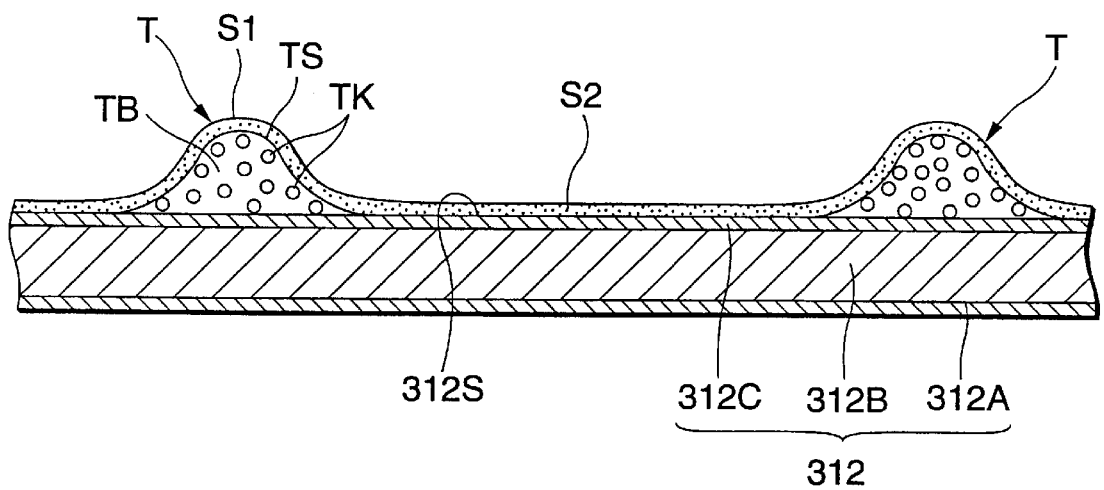
FIG. 13 is a sectional view showing a portion of a rod pipe according to another embodiment of the present invention.

FIG. 13 is a partial longitudinal cross section of the top section 312. The description given hereunder with respect to the top section 312 similarly applies to the butt section 310. The tube of the top section 312 (hereinafter referred to as a tube or rod pipe 312) has a three-layer structure composed of an intermediate layer 312B having most of the reinforcing fibers orientated in the longitudinal direction of the rod and thin outer and inner layers 312A and 312C both having most of the reinforcing fibers orientated in the circumferential direction. A spiral guide for a line is integrally provided on the inner surface of the tube 312, which is illustrated in FIG. 13 as a plurality of projections T. The spiral guide comprises a synthetic resin matrix TB, which may be the same as or different from the matrix resin of the tube 312, in which a large number (e.g., thousands) of reinforcing fibers TK, such as carbon fibers, as a wear-resistant material are orientated in the longitudinal direction of the spiral. A layer S1 is integrally formed on the surface of the guide. The top of the projection T with the layer S1 on is rounded to let a line run thereon smoothly. The reinforcing fiber TK can be high-modulus and high-strength graphite fiber or glass fiber, having an elastic modulus of 20 ton/mm$^2$ or higher.

Figure 15:
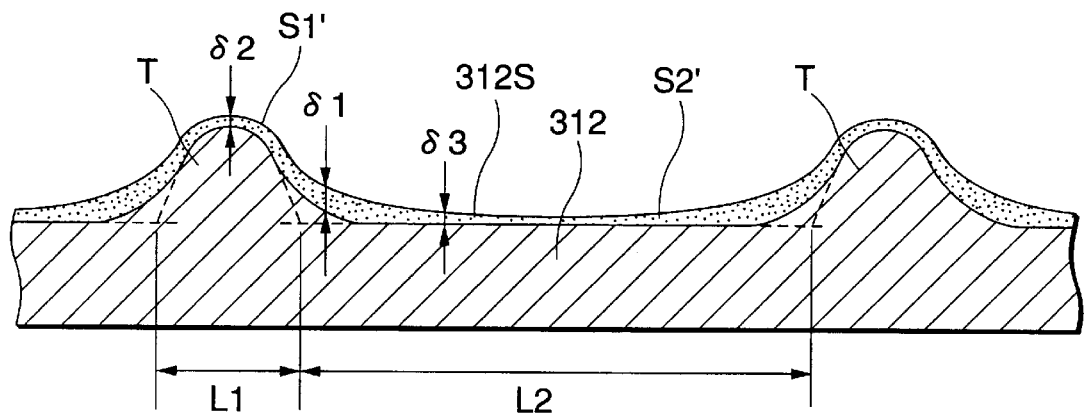
FIG. 15 is a sectional view showing a portion of a rod pipe according to another embodiment of the present invention.

A thin layer S1 and a thin layer S2 are formed on the surface TS of the projection T and the inner surface 312S of the tube 312, respectively. In the example shown in FIG. 13 layers S1 and S2 have continuity to cover all the inner surface of the tube inclusive of the surface of the projection T with a substantially uniform thickness. In a modification of FIG. 13, the layer S1 maybe provided on part of the projection T, and/or layer S2 may be provided on part of the inner surface of the tube 312 (i.e., part of the area between two adjacent projections T). Further, as shown in FIG. 15, the thickness of the layers S1 and S2 may vary.

The layers S1 and S2 are each a layer comprising a synthetic resin matrix containing a water-repellent material and a wear-resistant material or a layer comprising a water-repellent matrix containing at least one of a wear-resistant material and a lubricating material. The synthetic resin matrix may be the same as or different from that used in the tube 312. The water-repellent material typically includes fluoro resins and silicone resins. The form of the water-repellent material includes a form miscible in its liquid state (amorphous state), particles, fibers having as short a fiber length as whiskers, and the like. Examples of the water-repellent material are a tetrafluoroethylene resin, a trifluorochloroethylene resin, an acrylic silicone resin, and graphite fluoride. In particular, graphite fluoride (e.g., polycarbon monofluoride $[(CF)_n]$ and polydicarbon monofluoride $[(C_2F)_n]$) exhibits high water-repellency, showing an angle of contact of 120° or more with water.

Examples of suitable wear-resistant materials include the reinforcing fibers that can be used in the tube, such as carbon fiber, boron fiber, aramid fiber, glass fiber, ceramic fiber, and metallic fiber; metals, such as stainless steel and hard chrome; ceramics, such as agate, glass, silicon nitride, silicon carbide, tungsten carbide, alumina, and zirconia; composites of ceramics and metals; composites of reinforcing fibers and metals; and the like. Short fibers such as whiskers are also useful.

Solid lubricating materials include graphite, molybdenum disulfide, molybdenum selenide, molybdenum telluride, tungsten disulfide, tungsten selenide, β-tantalum sulfide, α-tantalum selenide, titanium disulfide, titanium selenide, boron nitride, zirconium disulfide, zirconium selenide, zirconium tellurium, β-niobium selenide, graphite fluoride, lead monoxide, molybdenum trioxide, gold, silver, lead, polyethylene, polypropylene, trifluororesins, melamine cyanurate, polytetrafluoroethylene (Teflon), and nylon 66 (Trade Name).

The layers S1 and S2 can be formed by applying a coating composition comprising the above components or thermoforming a separately prepared film (S1 and S2) simultaneously with integral thermoforming of a tube and a spiral guide. The layers can also be formed by plating by using, for example, a plating bath having dispersed therein polytetrafluoroethylene and nickel with a surface active agent.

Figure 14:
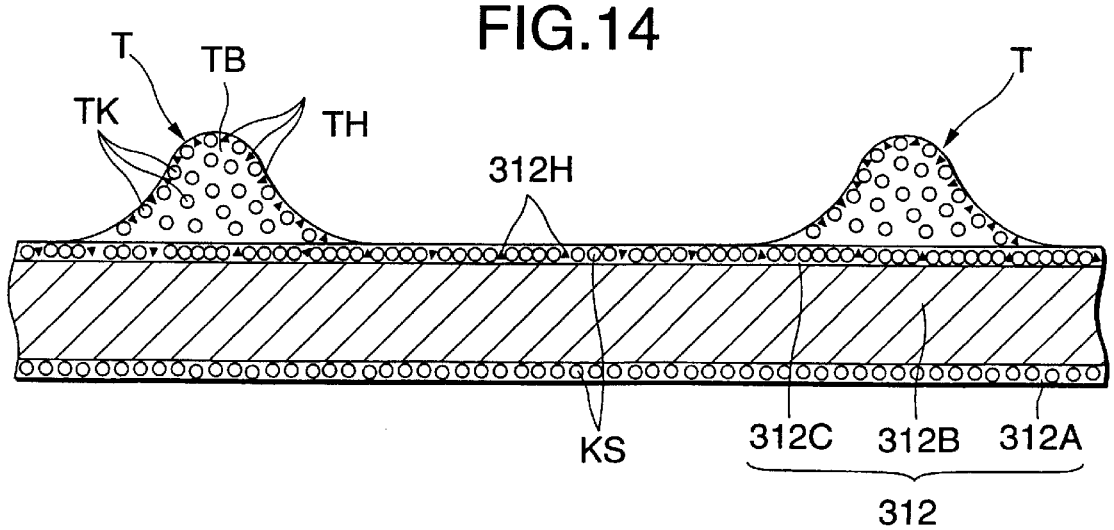
FIG. 14 is a sectional view showing a portion of a rod pipe according to another embodiment of the present invention.

FIG. 14 shows a modification of FIG. 13. In this embodiment, the inner layer 312C is made of an epoxy resin matrix having dispersed therein particulate water-repellent material 312H (indicated by solid triangles) and also containing reinforcing fibers KS as a wear-resistant material. Therefore, the inner layer 312C corresponds to the layer 312S in FIG. 13. The projection T is made of a synthetic resin matrix TB containing a large number of reinforcing fibers TK throughout its cross section as described above and also contains in the surface portion thereof a particulate water-repellent material TH (indicated by solid triangles). The water-repellent material TH is preferably the above-described graphite fluoride, such as polycarbon monofluoride or polydicarbon monofluoride. Having both a wear-resistant material (reinforcing fiber) and a water-repellent material, the surface portion of the projection T can be said to correspond to the layer S1 in FIG. 13. The water-repellent material TH does not necessarily need to be distributed over the whole surface portion of the projection T but is preferably present on the surface portion of the top of the projection T. Similarly, the water-repellent material 312H does not always need to be distributed over the whole area between every adjacent projections T.

The inner layer 312C containing the particulate water-repellent material 312H can be formed by, for example, using a prepreg of the reinforcing fibers KS impregnated with a synthetic resin containing the particulate water-repellent material 312H. The projection T containing the particulate water-repellent material 312H in at least the surface portion thereof can be formed by, for example, using a prepreg;of the reinforcing fibers TK impregnated with a synthetic resin TB containing the particulate water-repellent material 312H. In this case, the water-repellent material TH is distributed in not only the surface portion but in the inside of the projection T. The water-repellent material 312H and the material TH may be the same or different.

It is preferred that the reinforcing fiber TK used in the projection T be more durable (wearable) than the reinforcing fiber KS used in the inner layer 312C. This preference applies to other embodiments of the present invention. The water-repellent material is preferably present in the surface portion of the projection T or in the inner layer 312C in an amount of about 10 to 70% by volume. If the volume ratio of the water-repellent material is less than about 10%, the effect on water repellency is insubstantial. A volume ratio exceeding about 70% means that the proportions of other constituent components are too small to exert their functions. The proportion of the wear-resistant material in the surface also preferably ranges from about 10 to 70% by volume. If the volume ratio of the wear-resistant material is less than about 10%, the effect on wearability is insubstantial. A volume ratio exceeding about 70% means that the proportions of other constituent components are too small to exert their functions.

Compared with the embodiment of FIG. 13, the embodiment of FIG. 14 establishes integrity of the surface portion and the main body of the projection T because of the common matrix. Further, as long as the inner layer 312C and the intermediate layer 312B have a common matrix material, the inner layer 312C serving as a layer containing a water-repellent material 312H and a wear-resistant material (reinforcing fiber) KS has high adhesion to the intermediate layer 312B.

Where the water-repellent material 312H in the inner layer 312C is particulate as in the embodiment shown, the particle size is preferably about 0.1 to 10 μm. Substantial water repellency could not be expected of too small particles. If the particle size is too large, the inner layer 312C may tend to separate from the intermediate layer 312B, or the strength of the tube 312 would be reduced.

A still another embodiment of the present invention is shown in FIG. 15. In this embodiment projections T of a spiral guide are integral parts of the tube 312. A water-repellent layer S1' is provided on all the surface of the projection T inclusive of its top, and a water-repellent layer S2' is provided on all the area between adjacent projections T. The layers S1' and S2' are continuous. The thickness of the continuous layers S1' and S2' varies in such a manner that the thickness δ1 at the foot of the projection T is largest, the thickness δ3 at a position farther from the foot is smaller than the thickness δ1, and the thickness δ2 at the top of the projection T is smaller than the thickness δ3. As for the thickness at the middle between the adjacent projections T, it is still smaller than the thickness δ2 in this particular embodiment shown in FIG. 15. The layer S2' increases its thickness as it approaches the foot of the projection T. In short, the layer S2' is lowest at the middle between the adjacent projections so that water drops, even those once stopped on the top of the projections T, are liable to collect here.

The layers S1' and S2' may be either a layer merely having water repellency or a layer having additional functions, i.e., wear resistance and/or a lubricating effect, like the layers S1 and S2 of FIG. 13. Modifications can be added to the embodiment shown in FIG. 15 such that the layers S1' and S2' can have a uniform thickness as in the case of FIG. 13; the tube 312 can have a single layer structure as illustrated in FIG. 15 or a three-layer structure as in FIG. 13; and the structure of the projection T is not particularly limited.

The pitch of the spiral guide is set so that the distance L2 between every adjacent foots of projections T may be longer than the width L1 of the bottom of each projection T, which also applies to the other embodiments. It is preferable that L2 be about 5 times, particularly 10 to 20 times, L1. Further, the guide includes not only a spiral guide as particularly referred to in the foregoing embodiments but a plurality of annular guides.

The layer S1' should be provided on at least on the top of the projection T, and the layer S2' should be provided on at least part of the area between the adjacent projections T. The projection T preferably has a height of 0.3 mm or more. The height of the projection T is preferably the same as or more than the thickness of the tube near the projection T, particularly 1.1 to 2.5 times as high as the thickness of the tube.

A line is guided chiefly by the top of the projection T so that the layer S1', if containing no wear-resistant material, is subject to wear. However, since the thickness δ2 on the top of the projection T is small, wear scar, if made by a line, would be shallow, causing no great hindrance to running of the line. Even if the layer S1' on the top of the projection T is worn away, the projection T maintains the wear resistance as long as it is reinforced by a large number of reinforcing fibers as in the embodiments of FIGS. 13 and 14 so that the guide with a rounded top continues guiding the line with reduced friction for an extended period of time.

Figure 16:
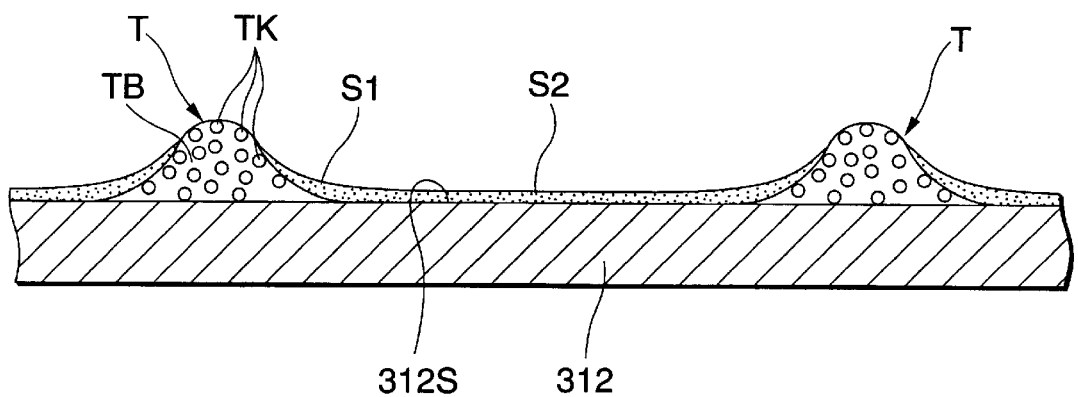
FIG. 16 is a sectional view showing a portion of a rod pipe according to another embodiment of the present invention.

FIG. 16 shows another modification of FIG. 13. As previously stated, the structure of the tube 312 is arbitrary. Projections T are integrally formed on the inner wall of the tube 312. A layer S1 having at least water repellency is provided integrally on the surface of the projection T except the top thereof. The layer S1 can have other functions as described with respect to FIG. 13. On the inner surface of the tube 312 is provided a layer S2 in the same manner as in FIG. 13. The layers S1 and S2 are continuous. The projection T is reinforced by a large number of reinforcing fibers orientated in the longitudinal direction of the spiral guide or the circumferential direction of annular guides. Therefore, the top of the projection T has durability, hardly wearing by the contact with a fishing line. Since the layer S1 is provided on both sides of the projection T, water drops adhered to the top easily slide down on the water-repellent layer S1, making a contribution to reduction of friction.

Where projections T are made of a fiber-reinforced plastic similarly to the tube, they have good adhesion to the tube, being prevented from coming off the tube. Where, in particular, the projections and the tube are made of the same resin matrix, the integrity is further ensured. In addition, the projections T provided as a spiral guide or a plurality of annular guides contribute to prevention of collapse of the tube.

While projections T are generally formed inseparably from the tube, cases are sometimes met with, depending on the kind of the matrix resin, in which they separate from the tube when the tube 312 is greatly deflected. The layers S1 and S2 are effective in preventing such separation. Further, these layers give thickness to the tube 312, serving for strengthening the tube 312 against collapse. These advantages are also obtained in other embodiments as far as the layers S1 and S2 (S1' and S2') cover the vicinities of the foots of projections T.

In the embodiments, if at least the upper half of each projection has a smooth surface, it would be helpful to ensure the effect of the water repellency in reducing the friction. Further, the inner surface of the tube can have fine unevenness by projecting particles, such as water-repellent particles, over its surface to form somewhat deep valleys in which an air bubble is contained. The air bubbles will further make the inner surface of the tube more repellent against water.

The projection T does not necessarily need to be solid and can be hollow. The fishing rod is not limited to the spinning rod hereinabove described.

The present invention provides a through-type fishing rod having improved water repellency in the inside thereof to prevent water drops from adhering to a line and to reduce the resistance against a running line.

What is claimed is:

1. An intraline type fishing rod comprising:
   a hollow rod pipe having an internal surface and an external surface;
   a plurality of line guide protrusions protruding radially inwardly from the internal surface, each of the line guide protrusions having front and rear ends continuous to the internal surface in a longitudinal direction of the rod pipe, an apex being the greatest distance from the internal surface radially of the rod pipe, and front and rear slopes extending respectively from the apex to the front and rear ends; and
   a separate water-repellent layer extending continuously between adjacent two of the line guide protrusions, the water-repellent layer entirely covering at least the rear slope and rear end of a forwardly located one of the adjacent line guide protrusions, the internal surface between the rear end of the forwardly located one and the front end of a rearwardly located one of the adjacent line guide protrusions, and the front end and front slope of the rearwardly located one.

2. The intraline fishing rod according to claim 1, wherein the apices of the adjacent two of the line guide protrusions are exposed from the water-repellent layer.

3. The intraline fishing rod according to claim 1, wherein the apices of the adjacent two of the line guide protrusions are covered by the water-repellent layer.

4. The intraline fishing rod according to claim 3, wherein the water repellent layer at the apices has the smallest radial thickness.

5. The intraline fishing rod according to claim 4, wherein the radial thickness of the water repellent layer is gradually increased from the apex of the rearwardly located line guide protrusion to the front end of the rearwardly located line guide protrusion along the front slope of the rearwardly located line guide protrusion.

6. The intraline fishing rod according to claim 4, wherein the radial thickness of the water repellent layer is gradually decreased from the front end of the rearwardly located line guide protrusion, maintained constantly along the internal surface and then gradually increased to the rear end of the forwardly located line guide protrusion.

7. The intraline fishing rod according to claim 4, wherein the radial thickness of the water repellent layer is gradually decreased from the rear end of the forwardly located line guide protrusion to the apex of the forwardly located line guide protrusion along the rear slope of the forwardly located line guide protrusion.

8. The intraline fishing rod according to claim 1, wherein the line guide protrusions are formed by a single spiral guide member.

9. The intraline fishing rod according to claim 1, wherein the line guide protrusions contain, as reinforcing fibers, graphite fibers or glass fibers having an elastic modulus of 20 ton/mm$^2$ or more.

10. The intraline fishing rod according to claim 1, wherein the rod pipe includes an internal layer defining the internal surface, an external layer defining the external surface and an intermediate layer interposed between the internal and external layers, each of the internal and external layers containing fibers mainly directed in a circumferential direction, and the intermediate layer containing fibers mainly directed in the longitudinal direction.

11. The intraline fishing rod according to claim 1, wherein the water-repellent layer contains one of a fluoro resins, a silicone, and waxes.

12. The intraline fishing rod according to claim 11, wherein the water repellent layer contains said fluoro resin, said fluoro resin contains one of a tetrafluoroethylene oligomer (TFEO), a polytetrafluoroethylene (PTFE), a trifluorochloroethylene resin, and a tetrafluoroethylene-hexafluoropropylene copolymer resin (FEP) as a matrix resin.

13. The intraline fishing rod according to claim 11, wherein the water-repellant layer contains said fluoro resin, said fluoro resin contains one of a tetrafluoroethylene oligomers (TFEO), a polytetrafluoroethylene (PTFE), a trifluorochloroethylene resin, and a tetrafluoroethylene-hexafluoropropylene copolymer resin (FEP), and a graphite fluoride as one of particles and short fibers.

14. The intraline fishing rod according to claim 11, wherein the silicone resin contains an acrylic silicone resin.

15. The intraline finish rod according to claim 1, wherein said one of said fluoro resin, silicone and waxes from one of a substantial portion of the water repellant layer and one of particles and short-fibers mixed in the substantial portion.

* * * * *